Oct. 2, 1934.     T. KOBAYASHI     1,975,212
NET MAKING MACHINE
Filed Jan. 10, 1934      5 Sheets-Sheet 4
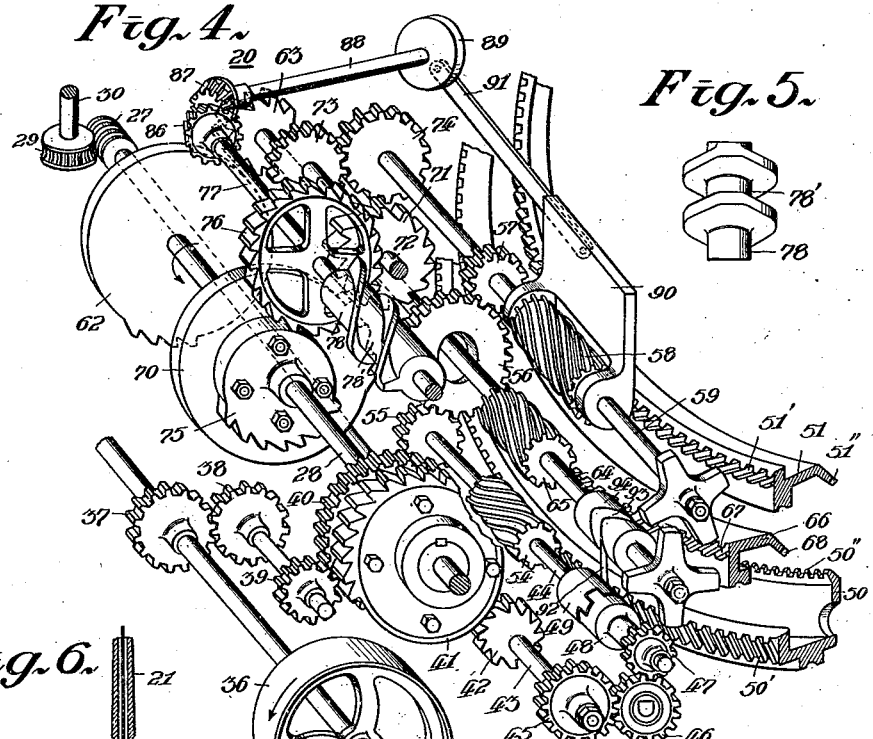
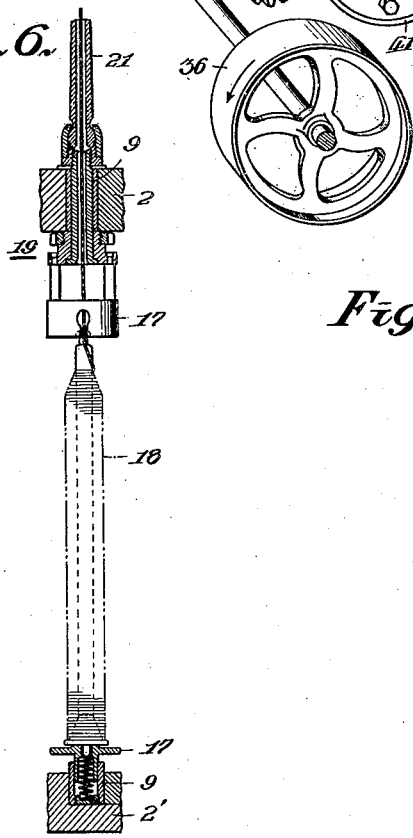
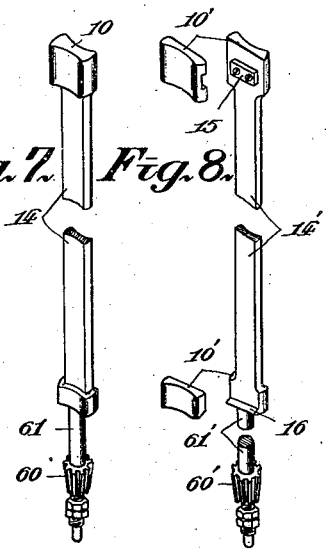
INVENTOR.
T. Kobayashi
BY Marks & Clark
ATTORNEYS

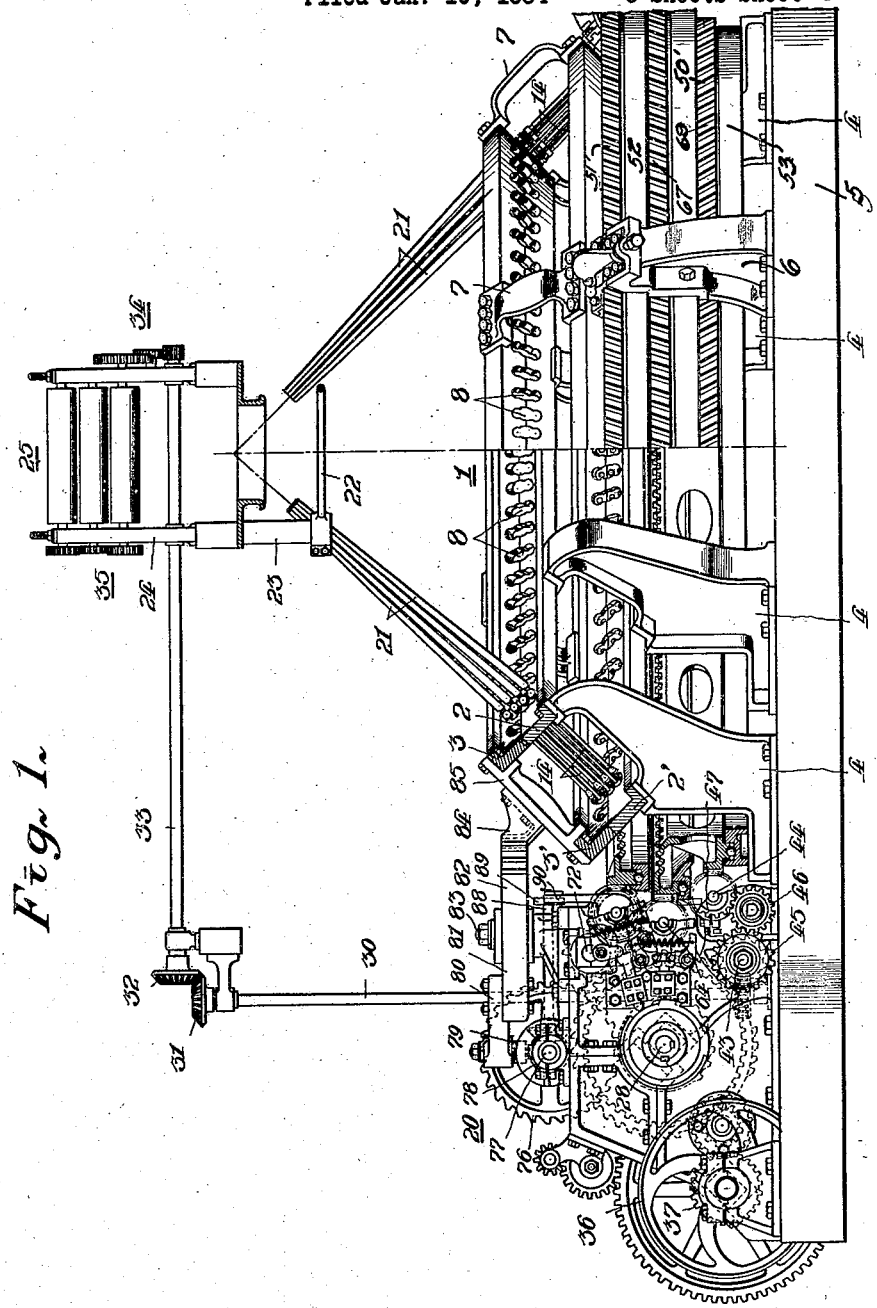

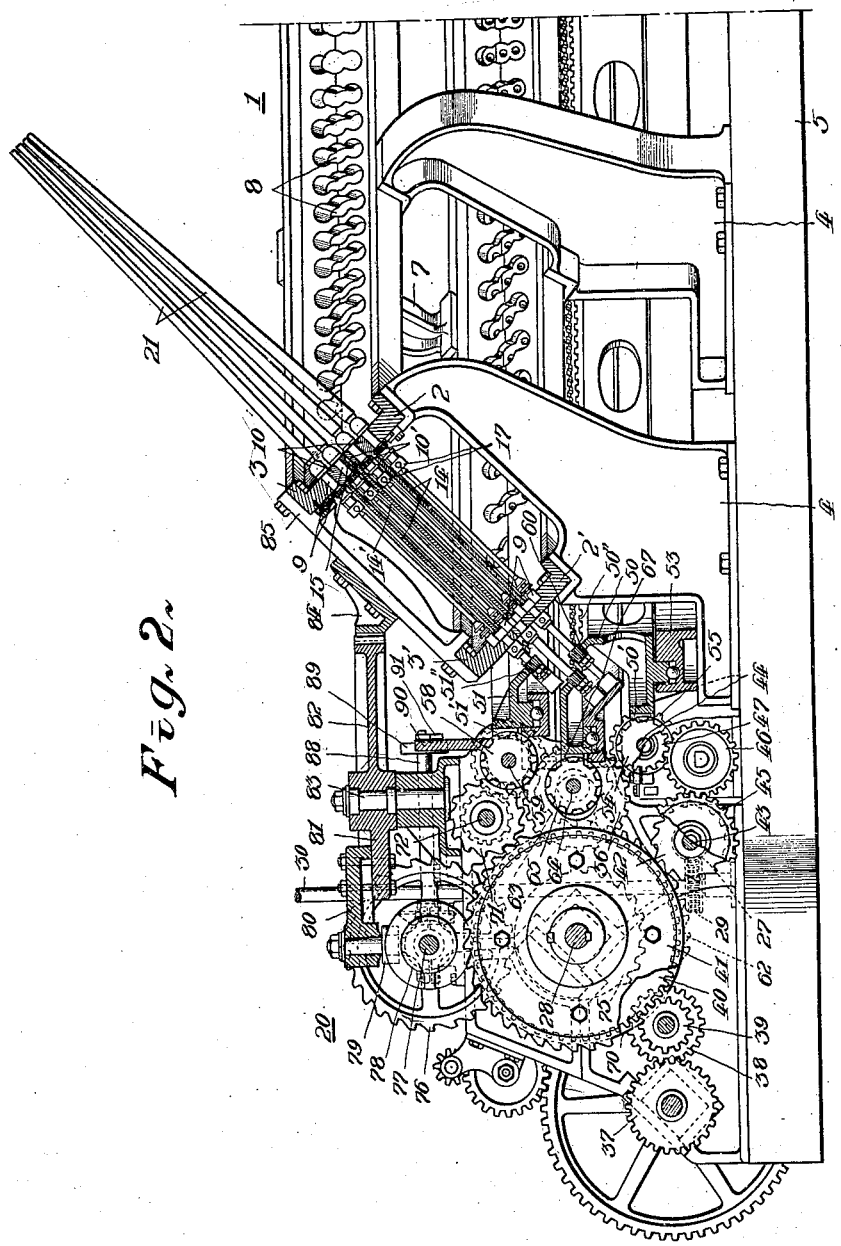

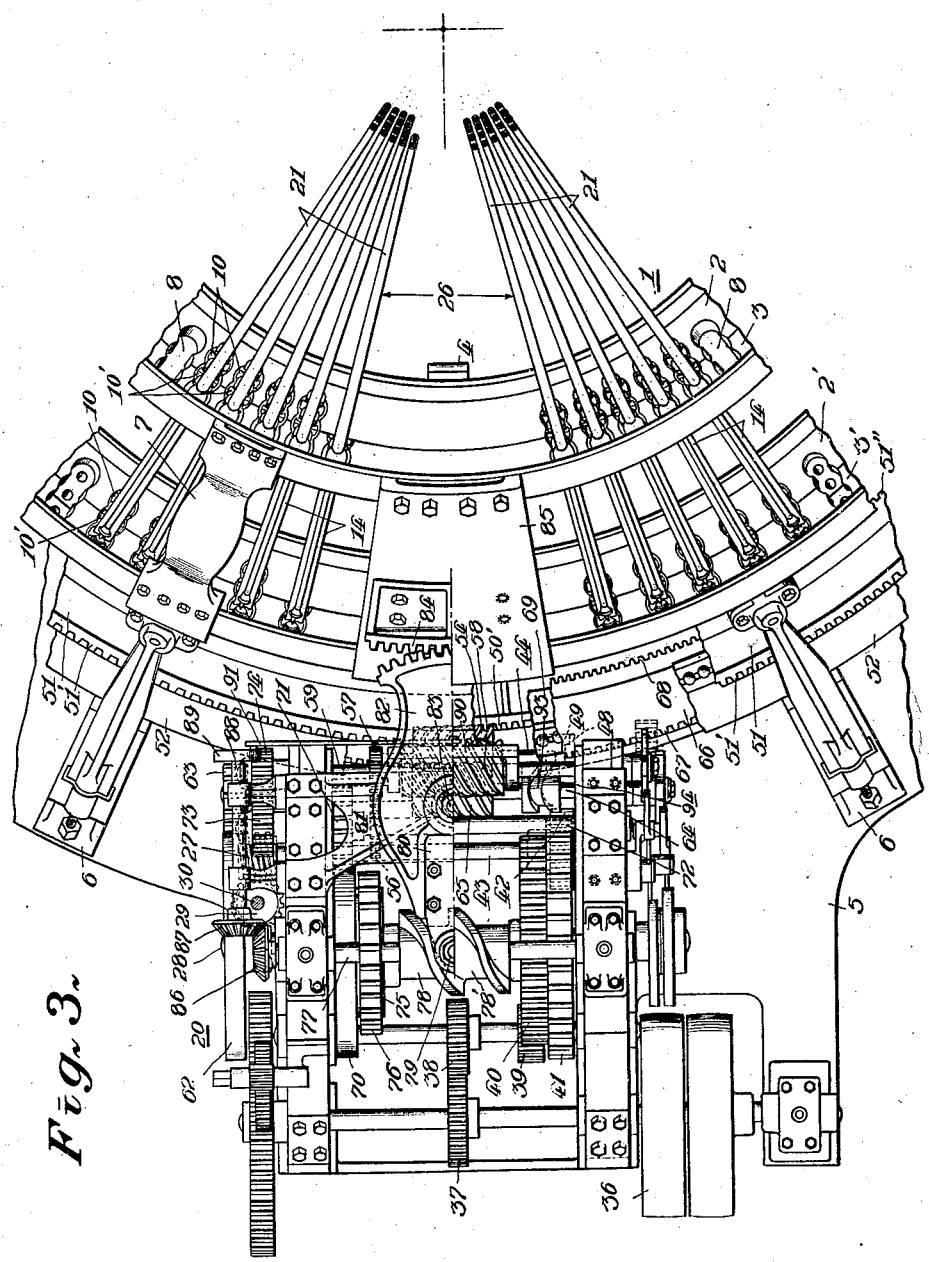

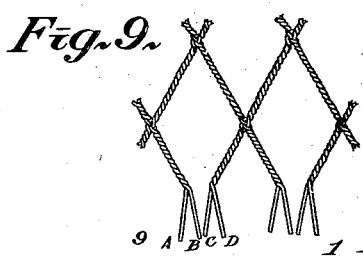
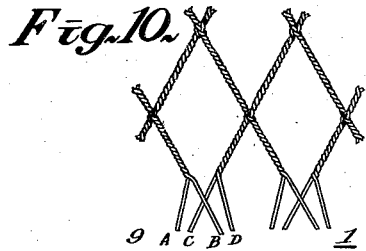
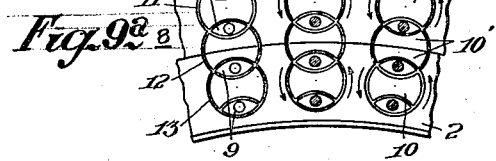
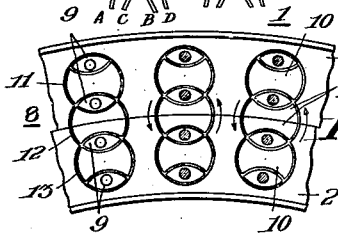
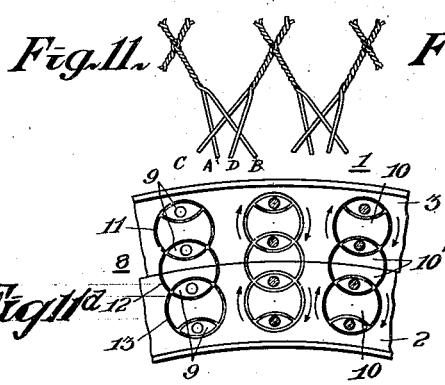
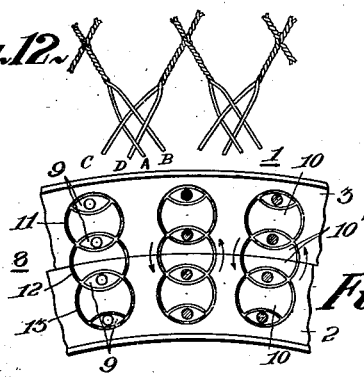
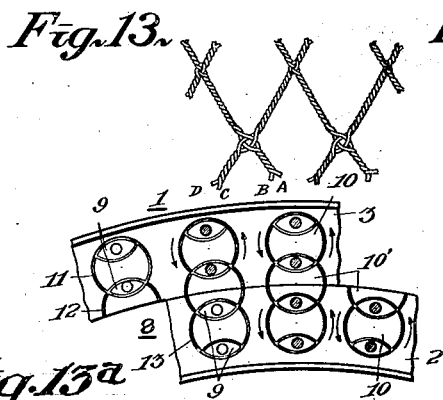
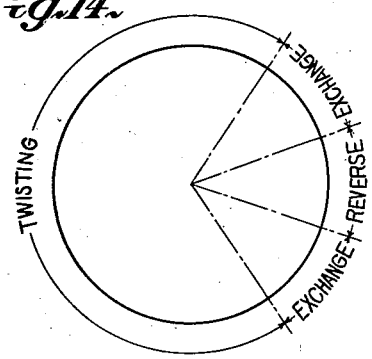

Patented Oct. 2, 1934

1,975,212

UNITED STATES PATENT OFFICE 1,975,212

NET MAKING MACHINE

Teruasa Kobayashi, Fukuyama-Shi, Japan

Application January 10, 1934, Serial No. 706,108

1 Claim. (Cl. 96—4)

This invention relates to improvements in net-making machines for netting fabrics used for fishing and other purposes, of such a kind in which is employed a working platform composed of an upper and a lower platform, each of which consists of a stationary and reciprocating plates and is provided with a series of working grooves extending across said two plates, in which the working heads of the spool carriers are operated by means of cam rollers to effect the intertwisting and interlocking operations of strands for making netting fabric, means being provided whereby the intermittent reciprocating motion of the reciprocating plate is effected through a circular length corresponding to one pitch of the working grooves, that is, the central distance between adjacent working grooves, during the course of the intertwisting operation of strands.

The object of the invention is to provide a net-making machine of the above mentioned kind of higher working efficiency than those hitherto used, particularly in case of the machine for making a netting fabric of small meshes.

The machines of the above mentioned kind are shown and described in United States patents to Kakuda, 1,664,113, March 27, 1928, 1,667,461, April 24, 1928, and 1,784,188, December 9, 1930; to Yokoyama, 1,795,385, March 10, 1931. In the machine, the working platform extends horizontally and straightly and the pitch of the working grooves in the working platform, that is, the central distance between adjacent working grooves, must be made small correspondingly in the machine for making netting fabric of small meshes, so that ample space for a spool having a large amount of strand wound thereon can not be provided. Obviously, the smaller the amount of strand on a spool, the sooner will be the exhaustion of strand on the spool, upon working, and consequently it must frequently be necessary to replace the empty spool by a new spool full of strand, so that the working efficiency of the machine is considerably lowered, in case of the machine for making netting fabric of small meshes.

According to my invention, the working platform of the machine is made in a circular ring and inverted frusto-conical shape, and consequently the working grooves may be arranged in the working platform at any desired distance apart to provide ample space for each spool with a large amount of strand, even in the machine for making netting fabric of small meshes, so that the above mentioned disadvantage in the machine of the above mentioned kind hitherto in use may be dispensed with.

The invention will be better understood from the following description with reference to the accompanying drawings, in which:—

Fig. 1 is a side view of a machine embodying the invention, partly in section and the most part of the arrangement of the cam rollers, working heads and spool carriers and the strand-leading-out devices being omitted for clearness.

Fig. 2 is a vertical section of the left hand part of the line II—II of Fig. 1, in enlarged scale, the take-up arrangement being omitted.

Fig. 3 is a plan view of Fig. 2.

Fig. 4 is a perspective view of the operating mechanism of the machine, on enlarged scale.

Fig. 5 is a detail plan view of a cam for the operating mechanism of the machine.

Fig. 6 is a detail view showing a strand-leading-out device comprising spool carrier with a spool, partly in section and in enlarged scale.

Fig. 7 is a detail perspective view of a side cam roller with a supporting arm.

Fig. 8 is a similar view of an intermediate cam roller, one half with the supporting arm, and other half being separated.

Figs. 9, 10, 11, 12 and 13 illustrate various stages in the manufacture of a mesh of netting fabric.

Figs. 9a, 10a, 11a, 12a and 13a illustrate the portions of the working heads operated by cam rolls.

Fig. 14 is a diagram illustrating the cycle of operation of the machine.

Referring now to the drawings, the working platform 1 comprises a stationary plate 2 and a reciprocating plate 3, which form the upper platform, and a stationary plate 2' and a reciprocating plate 3', which form the lower platform. Each of the upper and lower platforms is made in circular ring and inverted frusto-conical shape, the lower one being of larger diameter than that of the upper one, as shown. The stationary plates 2 and 2' are fixedly mounted on a set of standards 4 secured to a base 5, and the reciprocating plates 3 and 3' are movably mounted on another set of standards 6 secured to the base 5, and are connected together by means of a number of connecting members 7, so that the reciprocating plates may be moved together as one unit. The arrangement of the upper and lower platforms is such that they are in a conical relation, as shown.

The upper and lower platforms are provided with a series of working grooves 8 (Figs. 1, 9a)

in which the working heads 9 (Fig. 9a) of the spool carriers 17 are operated by means of cam rollers 10 and 10'. The working groove 8 consists of three circular holes 11, 12 and 13 formed in series so as to somewhat overlap the intermediate hole 12 to make a somewhat circular corrugated groove, the intermediate hole 12 being located to equally extend across the abutting edges of the stationary and reciprocating plates 2 and 3 or 2' and 3', as shown in Figs. 1, 2, and 9a. Within each of the three holes, which constitute a working groove, is inserted a cam roller 10 or 10' having opposite convex surfaces and concave surfaces (Figs. 9a, 10a, 11a, 12a and 13a). A pair of the cam rollers 10 in the side circular holes 12 and 13 of the upper and lower platforms are made integral with a supporting arm 14, as shown in Fig. 7, but they may be secured to the arm in any other desired manner. In order to permit the movement of the reciprocating plates 3 and 3', the intermediate cam rollers 10' are made in two halves, one half dealing with the groove belonging to the stationary plate being made integral with the arm 14' or secured to the arm by suitable means and other half dealing with the groove belonging to the reciprocating plate is suitably supported on the reciprocating plate and is in engagement with the supporting arm 14' by means of projections 15 and 16 on the said arm, as shown in Fig. 8. Within each of four empty spaces left unoccupied by the cam rollers in each working groove is inserted the working head 9 of the spool carrier 17 (Fig. 6), of a shape substantially complementary to that of the space, that is, of a cross section form of double convex lens in general outline, so that the working head 9 may be caused to make round motion in the holes of the working groove by means of the cam rollers 10 or 10', as shown in Figs. 1, 2, 9a, 10a, 11a, 12a and 13a.

The spool 18 (Fig. 6) with strand is supported between the working heads 9 in the working grooves in the upper and lower platforms through means of the spool carriers 17 and a strand-leading-out device 19, as shown in Fig. 6. Further description of the arrangement is omitted, as the arrangement may be identical with that shown and described in United States patent to Yokoyama, 1,795,385, March 10, 1931, or may be any other suitable arrangement.

A part of the working platform adjacent to the operating mechanism 20 is not provided with the working grooves, as indicated by 26 in Fig. 3. Strand-leading tubes 21 extend upwards from the working heads 9 in converging relation, and are leaned over a ring-shaped rack 22 near their upper ends. The rack is supported by an arm 23 depending from the frame 24 for take-up rollers 25 for netting fabric into the space 26 (Fig. 3) clear of the strand-leading tubes. The frame 24 is suitably secured to the beams or walls of the building of a work shop (not shown).

With the arrangement, when two side cam rollers 10 of three cam rollers in each working groove are rotating in a direction, for instance, in the counter clockwise direction as indicated by arrows in Fig. 9a, the intermediate cam roller 10' being at rest, the working heads 9 make round motion by pair, in the side circular holes 11 and 13, to intertwist each pair of strands, such as A, B and C, D (Fig. 9). After each pair of strands has been intertwisted through a desired length, and when the working heads are in a position as shown, the intermediate cam roller 10' is turned through an angle of 180 degrees in the same direction as above mentioned direction, that is, in the counter clockwise direction as indicated by arrows in Fig. 10a, the side cam rollers 10 being at rest, to exchange the position of two working heads in the intermediate circular hole 12 of each working groove and to cause a strand of each pair of strands such as indicated by B to cross over another strand such as indicated by C (Fig. 10). Then the side rollers are turned in the reverse direction, that is, in the clockwise direction, as indicated by arrows in Fig. 11a, through an angle of 180 degrees, the intermediate cam roller being at rest, to cause the working heads in the side circular holes 11 and 13 of each working groove to make round motion to cause a strand of the pair of strands, such as indicated by C to cross over a strand of another pair of associated strands, such as indicated by A, the other one of the first mentioned pair of strands, such as indicated by D to cross over the other one of the second mentioned pair of strands, such as indicated by B (Fig. 11). Then the intermediate cam roller 10' is turned in the same direction as before, that is, in the counter clockwise direction as indicated by arrows in Fig. 12a, through an angle of 180 degrees, the side cam rollers 10 being at rest, to exchange the position of two working heads in the intermediate circular hole 12 of each working groove and to cause a strand of the pair of strands, such as indicated by A to cross over a strand of another pair of strands, such as indicated by A. Then the side cam rollers 10 are turned in the same direction as before, that is, in the counter clockwise direction, the intermediate cam roller 10' being at rest, to cause each of the pairs of strands such as indicated by A, B and C, D to be intertwisted through a desired length, whereby the interlocking of strands is completed, and at the same time the reciprocating plates 3 and 3' of the working platform are turned in a direction through a length corresponding to the central circular distance between two consecutive working grooves, that is, the pitch of the working grooves, so as to cause each pair of the associated two pairs of strands in a working groove to associate with other pair of strands in adjacent groove for making a mesh of netting fabric, as shown in Fig. 13. In the next operation, upon repeating the above described operation, the reciprocating plates 3 and 3' are turned in the reverse direction through a length corresponding to the central circular distance between two adjacent working grooves. The netting fabric as formed is taken up in twice-folded relation by means of the take-up rollers 25 operated from the operating mechanism 20 through a worm 27 secured to a shaft 43 and worm wheel 29 secured to a shaft 30 (Fig. 4), a bevel gear 31 secured to the shaft 30 and a bevel gear 32, secured to a shaft 33 and trains of gearings 34 and 35 (Fig. 1). Fig. 14 diagrammatically illustrates the cycle of the intertwisting exchange, reverse, exchange and intertwisting operations.

The operating mechanism 20 is provided for purpose of effecting the above described operation of parts of the machine, necessary for making netting fabric.

The shaft 28 is driven from a suitable power source through means of a pulley 36, and gears 37, 38, 39 and 40, in a direction as indicated by the arrow. When a partly toothed wheel 41 secured to the shaft 28 meshes with a gear 42 secured to a shaft 43, the motion is transmitted from the shaft 28 to a shaft 44 through means of a gear 45, idle wheel 46 and gear 47 having a complemental clutch member 48 and mounted on the shaft 44 so as to be free to rotate but not to move endwise, supported by suitable bearing, a moving clutch member 49 splined to the said shaft being moved into registry with the said complemental clutch member to establish driving connection of the shaft 44 and gear 47, and thence the motion is transmitted to gear rings 50 and 51, which are formed with external worm wheels 50' and 51' and internal bevel wheels 50" and 51" respectively and are carried by ball bearings 52 and 53 supported by the standards 6 secured to the base 5 respectively (Figs. 1 and 2), through means of a worm 54 secured to the shaft 44 and engaging the worm wheel 50', and a gear 55 secured to the shaft 44, idle wheel 56, gear 57 secured to a shaft 59 and worm 58 splined to the shaft 59 so as to be free to rotate but not to move endwise, and engaging the worm wheel 51', respectively. In this manner, the bevel gear 50" and 51" are rotated in the counter clockwise direction to rotate a bevel gear 60 secured to the extension 61 of each supporting arm 14 of the side cam rollers 10 (Fig. 7) and meshing with the said bevel gears, and hence the side cam rollers in the same direction, thereby each pair of strands being intertwisted through a certain length as shown in Fig. 9.

When the teeth of the partly-toothed wheel 41 disengage with the gear 42, the side cam rollers 10 will come to rest, and the teeth of a partly toothed wheel 62 will come into engagement with a gear 63 secured to a shaft 64 to which a worm 65 is secured, whereupon the worm will be driven to rotate a gear ring 66 in the counter clockwise direction, which is formed with an external worm wheel 67 meshing with the worm 65 and internal bevel wheel 68 meshing with a bevel wheel 60' secured to the extension 61' of each supporting arm 14' of the intermediate cam rollers 10' (Fig. 8), and is carried by a ball bearing 69 supported by the standards 6 (Figs. 1 and 2). Thereupon the intermediate cam roller 10' is turned in the counter clockwise direction through an angle of 180 degrees, so as to exchange the position of two working heads 9 in the intermediate circular hole 12 in each working groove to cause one strand of a pair of strands to cross over one strand of another associated pair of strands, as shown in Fig. 10. Then the teeth of the partly toothed wheel 62 will disengage with the gear 63, and hence the intermediate cam roller will come to rest, and the teeth of a partly toothed wheel 70 will come into engagement with a gear 71 secured to a shaft 72. Thereupon the gear rings 51 and 50 are rotated in the reverse direction, that is, in the clockwise direction, through means of gear 73 secured to the shaft 72, gear 74 secured to the shaft 59, and the worm 58, and the gear 57, idle wheel 56, gear 55 and the worm 54 respectively to turn the side cam rollers in each working groove in the reverse direction through an angle of 180 degrees, to cause strands C and D of a pair of strands to cross over strands A and B of another associated pair of strands respectively, as shown in Fig. 11. Then, the teeth of the partly toothed wheel 70 will come into disengagement with the gear 71, and hence the side cam rollers will come to rest, and the teeth of the partly toothed wheel 62 will come into engagement with the gear 63. Thereupon, the gear ring 50 is rotated again in the counter clockwise direction to turn the intermediate roller in the counter clockwise direction through an angle of 180 degrees, so as to exchange the position of two working heads in the intermediate circular hole 12 in each working groove to cause one strand A of a pair of strands to cross one strand D of another associated pair of strands, as shown in Fig. 12. Then the teeth of the partly toothed wheel 62 will come into disengagement with the gear 63, and hence the intermediate cam roller will come to rest, and the teeth of the partly toothed wheel 41 will come into engagement with the gear 42, whereby the gear rings 50 and 51 are rotated in the counter clockwise direction in the aforementioned manner, to intertwist each pair of strands through a certain length, thereby an interlocking operation of strands being completed.

During an intertwisting operation of each pair of strands, when the complemental cam rollers which are not secured to the supporting arm 14' are positioned in the reciprocating plates, as shown in Fig. 13a, the teeth of a partly toothed wheel 75 will come into engagement with a gear 76 secured to a shaft 77 to exert a half revolution of the shaft. To the shaft 77 is secured a cam member 78 with a substantially double helical-shaped cam groove 78', (Figs. 4 and 5), to which a cam roller 79 engages, which is secured to an arm 80 secured to the extension 81 of a sector gear 82 pivotally mounted on a shaft 83 to meshes with a segment-wheel 84 secured to a member 85 connecting the upper and lower reciprocating plates of the working platform (Figs. 1, 2 and 3). Upon a half revolution of the cam member 78 due to a half revolution of shaft 77, the cam roller 79 is moved axially in respect of the said cam member from the left hand to the right hand or vice versa, in Fig. 3, whereby the reciprocating plates are turned in a direction through a circular length corresponding to a circular central distance between two consecutive working grooves, that is, the pitch of the working grooves. During the next twisting operation of each pair of strands the cam member is driven to make further a half revolution in the same direction as before, and the cam roller is moved axially in respect of the said cam member in the opposite direction whereby the reciprocating plates are turned in the opposite direction through the same length as before. Thus, the reciprocating plates intermittently make timed reciprocating motion.

It will be noted that, when the part of each working groove laying on the reciprocating plate is moved into registry with the next complemental groove in the stationary plate due to the reciprocating motion of the reciprocating plate during an intertwisting operation of each pair of strands, the bevel wheel 60 secured to the extension 61 of the supporting arm 14 of cam rollers in the side circular hole in each groove of the reciprocating plate must be moved with the cam rollers through a circular length corresponding to a circular central distance between two consecutive working grooves, that is, the pitch of the working groove, without making any relative movement to the internal bevel wheel 50" of the gear ring 50, otherwise the mechanism can not be in order. For this purpose, when the shaft 77 carrying the cam member 78 rotates, it imparts an endwise movement to the worm 58 meshing with the external worm wheel 50' of the gear ring 50 through means of bevel gear 86 secured to the shaft 77, a bevel gear 87 secured to a shaft 88, circular disk 89 secured to the shaft 88 and a link 91, one end of which is pivoted eccentrically on the disk 89, whilst the other end is connected with a yoke member 90 movably mounted on the shaft 59 and adapted to move the worm 58 endwise (Figs. 4 and 7), whereby the gear ring 51 is moved together with the bevel wheel 60, when the reciprocating plate is moved. It will be noted that the moving clutch member 49 must be disconnected from the complemental clutch member 48, when the side cam rollers 10 are rotated in the reverse direction, that is, in the clockwise direction, and this disconnection may be effected by any suitable means, for example, the clutch member 49 is provided with an arm 92, which is adapted to engage with a cam groove 93 provided in a cam member 94 secured to the shaft 64, the cam groove being suitably shaped to effect the disconnection or the connection of the moving clutch member 49 with the complemental clutch member 48, when the side cam rollers are rotated in the clockwise direction or counter clockwise direction.

Having now particularly described and ascertained the nature of my said invention, and in what manner the same is to be performed, I claim:—

A net-making machine for netting fabric for fishing and other purposes comprising a series of spool carriers having working heads, cam rollers for driving the working heads of the spool carriers, a working platform composed of an upper and a lower platform, each consisting of a circular ring of inverted frusto-conical shape, and arranged substantially in a conical relation, the diameter of the lower platform being larger than that of the upper platform, and provided with a series of working grooves, in each of which three cam rollers and four working heads of the spool carriers are operated, a take-up device consisting of rollers and an operating mechanism for driving the several mechanisms of the machine.

TERUASA KOBAYASHI.